US006405146B1

(12) United States Patent
Engel

(10) Patent No.: US 6,405,146 B1
(45) Date of Patent: Jun. 11, 2002

(54) METHOD OF ADAPTIVE WARM-UP OF FORCE VARIATION MACHINE

(75) Inventor: Jean Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/319,674

(22) PCT Filed: Dec. 30, 1996

(86) PCT No.: PCT/US96/20471
§ 371 (c)(1),
(2), (4) Date: Jun. 8, 1999

(87) PCT Pub. No.: WO98/29725
PCT Pub. Date: Jul. 9, 1998

(51) Int. Cl.[7] ............................................. G01M 17/02
(52) U.S. Cl. ....................... 702/105; 702/167; 73/146; 451/1; 451/5; 451/28
(58) Field of Search ................................ 702/105, 167, 702/170; 73/146, 9, 146.2, 146.3, 146.4, 146.5, 8; 451/1, 28, 5, 920, 254; 340/442, 444

(56) References Cited

U.S. PATENT DOCUMENTS

| 3,534,598 A | 10/1970 | Hermanns et al. ............ 73/146 |
| 3,739,533 A | 6/1973 | Iida et al. .................. 51/281 R |
| 3,946,527 A | 3/1976 | Beer ......................... 51/281 |
| 4,095,374 A | 6/1978 | Ugo ........................ 51/165 R |
| 4,805,125 A | 2/1989 | Beebe ....................... 364/570 |
| 4,837,980 A | 6/1989 | Rogers, Jr. ................. 51/165 R |
| 4,914,869 A | 4/1990 | Bayonnet et al. .......... 51/165 R |
| 5,263,284 A | 11/1993 | Wild ........................ 51/165.71 |
| 5,537,866 A | 7/1996 | Bangert et al. ................ 73/146 |

FOREIGN PATENT DOCUMENTS

| JP | 63-071340 | 3/1988 | .......... B29D/30/08 |
| JP | 63-182543 | 7/1988 | .......... G01M/17/02 |
| JP | 01-314935 | 12/1989 | .......... G01M/17/02 |
| JP | 02-259445 | 10/1990 | .......... G01M/17/02 |
| JP | 06-265444 | 9/1994 | .......... G01M/17/02 |

Primary Examiner—John S. Hilten
Assistant Examiner—Hien Vo
(74) Attorney, Agent, or Firm—Howard M. Cohn

(57) ABSTRACT

The invention relates to a warm-up cycle for each tire being tested on a force variation machine to stabilize the measurement parameters and optimize the warm-up cycle. The method for cycling each tire comprises the following steps. A tire type and preset tolerance values for each parameter of the tire being measured is inputted into the force variation machine. The tire is rotated in a first direction for two successive revolutions, data values for each of the parameters are calculated, and the differences between the calculated data values and the preset tolerance values are determined. Then the tire is rotated in a second opposite direction and the warm-up cycle is repeated. Continuing, the tire is rotated for one or more additional revolutions and the data values for the measured parameters are again calculated if necessary. Next, the differences between the calculated data values for each corresponding parameter measured during successive revolutions after the second revolution and the preset tolerance values are determined until the difference between the corresponding data values for the parameters measured during any two successive revolutions is less than the preset tolerance values.

15 Claims, 7 Drawing Sheets

METHOD OF ADAPTIVE WARM-UP OF FORCE VARIATION MACHINE

FIELD OF THE INVENTION

This invention relates to the field of optimizing tire uniformity, and more particularly to a method of adapting the warm-up cycle of a force variation machine for each tire to stabilize the measurement perimeters and optimize the warm-up cycle to provide accurate data and maximize utilization of the force variation machine.

BACKGROUND OF THE INVENTION

In the art of manufacturing pneumatic tires, rubber flow in the mold or minor differences in the dimensions of the belts, beads, liners, treads, plies of rubberized cords, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

The effects of non-uniformity are best explained by noting that several types of forces, which are of particular importance in the present application, are simultaneously exerted by a tire during its rotation under load against a surface. For example, radial run-out is an intrinsic tire non-uniformity best described as the "out of roundness" of the tire. Also radial forces are exerted in the radial direction of the tire, or in a direction perpendicular to its axis of rotation and non-tangential to the road surface. Additionally, lateral forces are exerted in the axial direction of the tire or in a direction parallel to its axis of rotation.

In a non-uniform tire, the radial run-out, the radial forces, and the lateral forces exerted by the tire will vary or change during its rotation. In other words, the magnitude and/or direction of the radial run-out, and the radial and lateral forces exerted by the tire will depend on which increment of its tread is contacting the surface.

The variations in radial and lateral force during rotation of a tire are usually caused by differences in the stiffness and/or geometry of the tire about its circumference or tread centerline. If these differences are slight, the radial and lateral force variations are considered insignificant and their effects unnoticeable when the tire is installed on a vehicle. However, when these differences reach a certain level, the radial and/or lateral force variations may be significant enough to cause rough riding conditions and/or difficult handling situations.

Consequently, methods have been developed in the past to correct for excessive force variations by removing rubber from the shoulders and/or the central region of the tire tread by means such as grinding. Most of these correction methods include the steps of indexing the tire tread into a series of circumferential increments and obtaining a series of force measurements representative of the force exerted by the tire as these increments contact a surface. This data is then interpreted and rubber is removed from the tire tread in a pattern related to this interpretation. These methods are commonly performed with a force variation machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. In a sophisticated tire uniformity machine (TUM) also known as a force variation machine (FVM), such as a Model No. D70LTW available from the Akron Standard Co. of Akron Ohio, the force measurements are interpreted by a computer and rubber is removed from the tire tread by grinders controlled by the computer. Examples of these methods are disclosed for example in U.S. Pat. Nos. 3,739,533, 3,946,527, 4,914,869, and 5,263,284.

In the past, force variation machines incorporated an adaptive warm-up cycle which is a method of adapting the Force Variation machine for each tire through real time data analysis of radial force, lateral force, radial first harmonic and phase angle. The warm-up period of the machine increases or decreases, depending upon the stabilization of these measurement parameters. The adaptive warm-up is intended to optimize the tire warm-up cycle to provide accurate data and maximum utilization of the equipment.

Current warm-up control methodology on Force variation machines consists of a fixed time function which initiates at the start of the tire loading sequence or after the loading of the tire is completed. At the completion of the fixed time warm-up, data is acquired and the machine cycle then advances to the next programmed step.

It has been found that the majority of tires will stabilize and warm up within the fixed time allowed. In some cases, tires require an extended amount of time to stabilize because of a varying number of circumstances. Often, however, the tires will stabilize in less than the allocated static warm-up time which results in under utilization of the Force variation machine.

It is an object of the present invention to provide a warm-up cycle for a force variation machine to obviate the problems and limitations of the prior art methods. Other objects of this invention will be apparent from the following description and claims.

SUMMARY OF THE INVENTION

In accordance with the invention, there is provided a first embodiment of a method for incorporating an adaptive warm-up cycle to a force variation machine for each tire being tested. The method includes the steps of rotating a tire mounted on the force variation machine in a first direction for two successive revolutions. Then the data values for the measured parameters are calculated for each of the two successive revolutions and the difference between the calculated data values for each of the corresponding measured parameters are compared with preset tolerance values. If the difference between the data values of each corresponding parameter is less than the preset tolerance values, the tire is graded with the data values of each parameter measured during the second revolution. Otherwise, the tire is rotated for additional revolutions in the first direction until the difference between the data values for the measured parameters measured during the second and third revolutions and so on are less than the preset tolerance values. Next, the tire is rotated in a second opposite direction and the steps are repeated. The tire being tested is graded with the data values of the measured parameters from the last revolution of the first and second opposite directions and the force variation machine is operated as needed.

Further, in accordance with the invention, there is provided a second embodiment of a method for incorporating an adaptive warm-up cycle to a force variation machine for each tire being tested. The second embodiment differs from the first embodiment in that the tire is rotated in a first direction for three successive revolutions and the data values for the measured parameters are measured for each of the three successive revolutions. Then, the difference between the calculated data values for each corresponding measured parameter measured during the first two successive revolutions are compared with the preset tolerance values. If the difference between data values of each corresponding parameter measured during the first two successive revolutions is less than the preset tolerance values, the data values of each parameter measured during the second revolution are used for grading the tire. Otherwise, the tire is rotated for a fourth revolution while the difference between data values of each corresponding parameter measured during the second and third revolutions are compared with the preset tolerance values while calculating the data values for the measured parameters from the fourth revolution. This continues with successive revolutions until the difference between the corresponding data values for the parameters measured during any two successive revolutions is less than the preset tolerance values. The adaptive warm-up cycle continues by repeating the steps while the tire is rotated in a second opposite direction. The tire being tested is graded with the data values of the measured parameters from the last revolution of the first and second opposite directions and the force variation machine is operated as needed. Also, in accordance with the invention, there is provided a third embodiment of a method for incorporating an adaptive warm-up cycle to a force variation machine for each tire being tested.

The third embodiment differs from the first and second embodiments in that the tire is rotated in a first direction for four revolutions in a first direction and the average of the data values for each parameter for the four revolutions of the tire are compared with the date values of the corresponding parameters during the fourth revolution of the tire. If the difference between the average data values and the data values of the fourth revolution are less than the preset tolerance values for each parameter, the tire is considered to be warmed up and the machine cycle continues. However, if the difference between the average data values for each parameter and the data values for the corresponding parameters calculated from the data generated during the fourth revolution is more than the preset tolerance values, the data values for each parameter for the next four revolutions in a first direction are calculated. Then, the data values from the eighth revolution are compared with the data values from the average of the data values for each parameter from the fourth to eight revolution. This process continues until these comparisons show that the parameters are not changing significantly, i.e., are less than the preset tolerance values. The adaptive warm-up cycle continues by repeating the steps while the tire is rotated in a second opposite direction. The tire being tested is graded with the data values of the measured parameters from the last revolution of the first and second opposite directions and the force variation machine is operated as needed.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
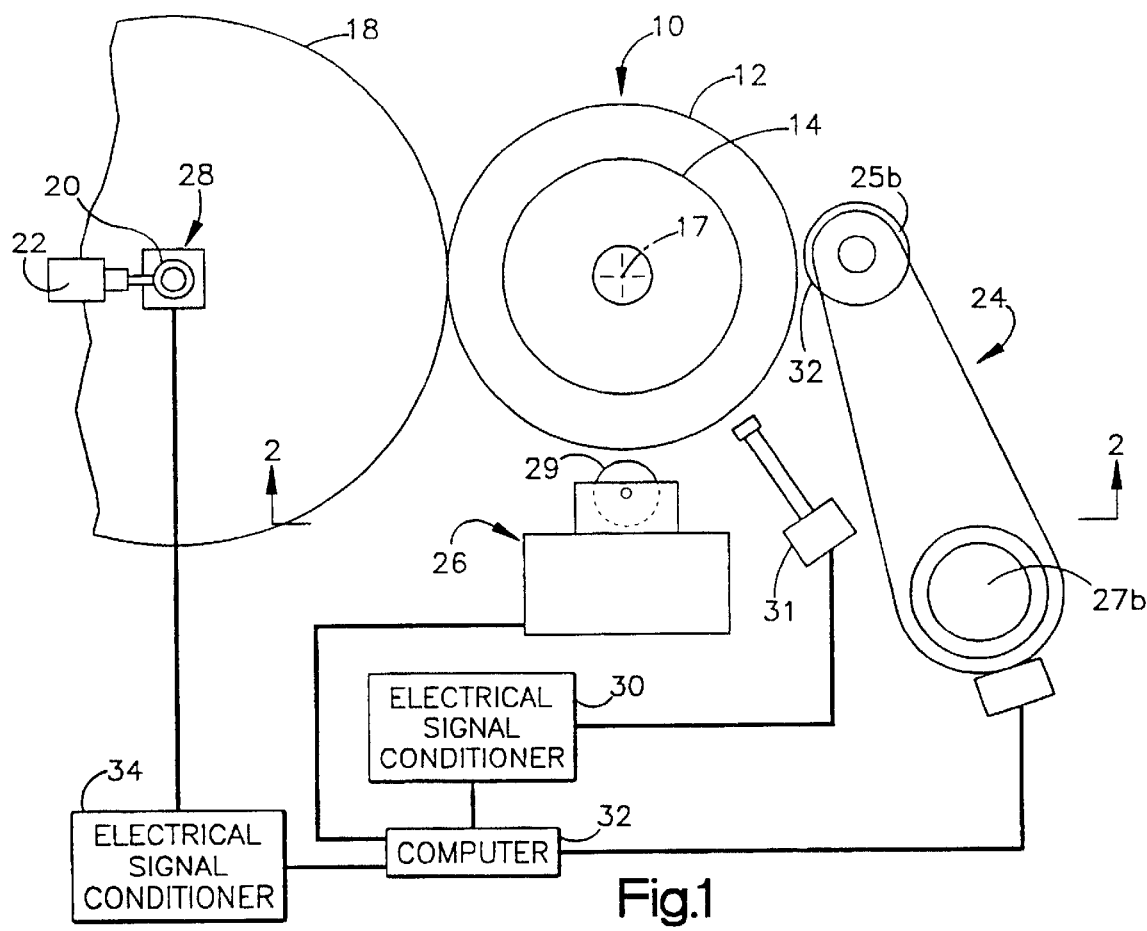
FIG. 1 is a schematic illustration of a top view of a force variation machine with a tire mounted thereon in accordance with the invention.
Figure 2:
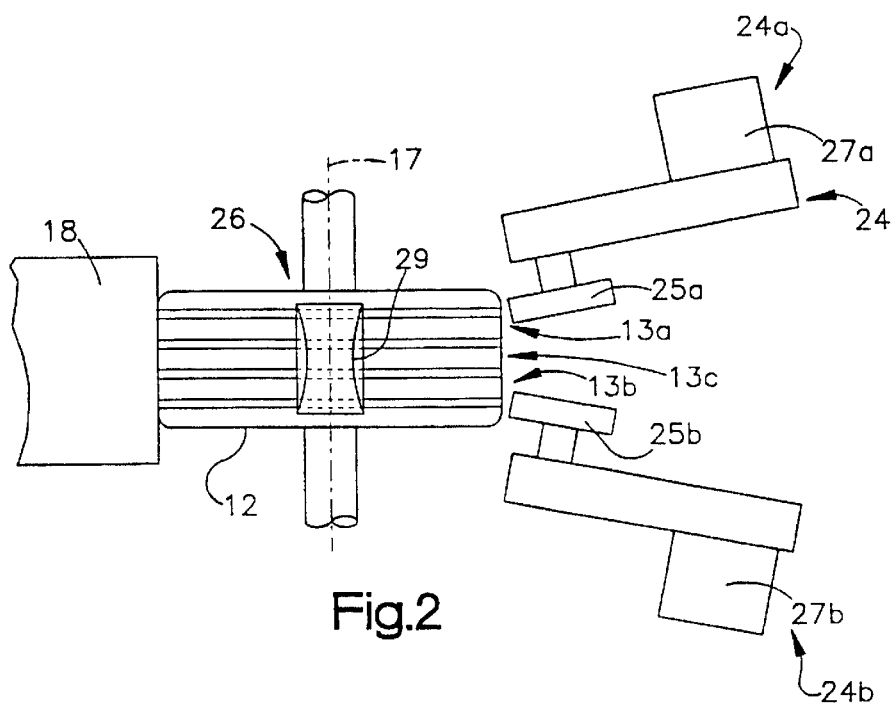
FIG. 2 is a side view through line 2—2 of FIG. 1 illustrating the relative location position of shoulder and center grinder assemblies.

Referring to FIGS. 1 and 2, there is illustrated a force variation machine (FVM) 10 with a tire 12 mounted thereon in accordance with the invention. Tire 12 is a typically a pneumatic tire having a circumferential tire tread with top and bottom shoulder regions 13a and 13b and a central region 13c between the top and bottom shoulder regions. The tire 12 is initially mounted on a rim 14 of force variation machine 10 and inflated to about 30 pounds per square inch (psi). A variable speed motor (not shown) rotates the tire 12 about an axis 17. The tire 12 is placed under load by a load wheel 18, rotatably supported on bearing blocks 20 on either side of the load wheel. The bearing blocks 20 are movable by means, such as electric motors 22 which operate through a device, such as for example a ball-and-screw connection, to move the load wheel 18 into and out of engagement with the tire 12. A shoulder grinding assembly 24 is located substantially 180° with respect to tire 12 from load wheel 18. The shoulder grinding assembly 24 includes top and bottom shoulder grinders 24a and 24b, which include grinding wheels 25a and 25b, respectively, that are powered by motors 27a and 27b and are independently moved into and out of engagement with the shoulder regions 13b and 13b, respectively. The top and bottom shoulder grinders 24a and 24b can be moved into and out of engagement with the shoulder portions by any conventional means, such as hydraulic servo devices (not shown). A center grinder assembly 26 is located approximately 90° counter-clockwise (CCW) from load wheel 18. The center grinder assembly 26 has a grinding wheel 29 that is powered by a motor (not shown) and is moved into and out of engagement with the central region 13c of the tread by conventional means, such as with an hydraulic servo device (not shown).

The load wheel 18 is used to load the inflated tire to a specified force (for example, 600 to 1900 lb) to simulate road conditions against which the tread of the tire rotates. Conventional load cells 28, which include radial and lateral load cell sections, are mounted on the axle of load wheel 18 on either side thereof to measure the force transmitted to the tire 12 as it rotates against the load wheel. An electric signal conditioner 34 transforms the force measurements sensed by the load cells 28 into electrical signals which can be received and stored in a computer 32. The lateral load cell sections measure the lateral force exerted by the tire 12 against load wheel 18 in a direction parallel to the axis of rotation extending about which the load wheel rotates. The radial load cell sections measure the radial force exerted by the tire 12 against at the point of intersection of the tire 12 and the load wheel 18.

A radial run-out transducer 31, shown in FIG. 1, is positioned on or adjacent the tread surface of tire 12 for sensing the variations in the tread diameter around the tire's circumference. The transducer 31 outputs the run-out signal through a signal conditioner 30 to computer 32. The computer 32 stores the electrical signals received from the signal conditioners 30 and 34 and assigns a force value to each of a large number of increments of the tire circumference.

The computer 32 is programmed to determine whether the differences in the force values of the various increments are above or below a first set of chosen limits. In the event that the force values of the various increments are above or below the first set of chosen limits, the force values are compared to a second set of chosen limits which are above and below the first set of chosen limits, respectively. In the event the force values are above or below the second set of chosen limits, the tire is removed from the machine, graded, and scrapped if necessary. Two sets of chosen limits are used for lateral force values, radial run-out, and radial force values. When any of the force values of the tire are outside the first set of chosen limits and inside the second set of chosen limits, computer 32 determines the corrective grinding action to take, as discussed in more detail below. Based on this information, computer 32 sends commands to the shoulder grinding assembly 24 or the center grinder assembly 26 to position the grinding assemblies, as required.

After a tire 12 is mounted onto the rim 14 of force variation machine 10 and inflated to the desired pressure, the tire is loaded by moving load wheel 18 into engagement with the tire. Prior to actually grinding the tire 12, the force variation machine 10 is run through an adaptive warm-up cycle to stabilize the measurement perimeters and optimize the warm-up cycle to provide accurate data and maximize utilization of the force variation machine. The adaptive warm-up cycle is initiated by turning the tire 12 through several revolutions to warm-up the tire before operating data is collected. This warm-up cycle is required to flex the tire and stabilize the tire carcass and its tracking position against the load wheel 18 to ensure that the force variation machine 10 accurately tests the tire.

The current warm-up procedure, used a specified period of warm-up time, i.e., about 4 seconds to about 10 seconds for one side of the tire. Then the tire is turned over and rotated in the opposite direction for the same specified period of warm-up time. The specified time period is empirically determined and involves a trade-off between machine cycle time and ensuring that the tire is stabilized before the data is collected.

Figure 3A:
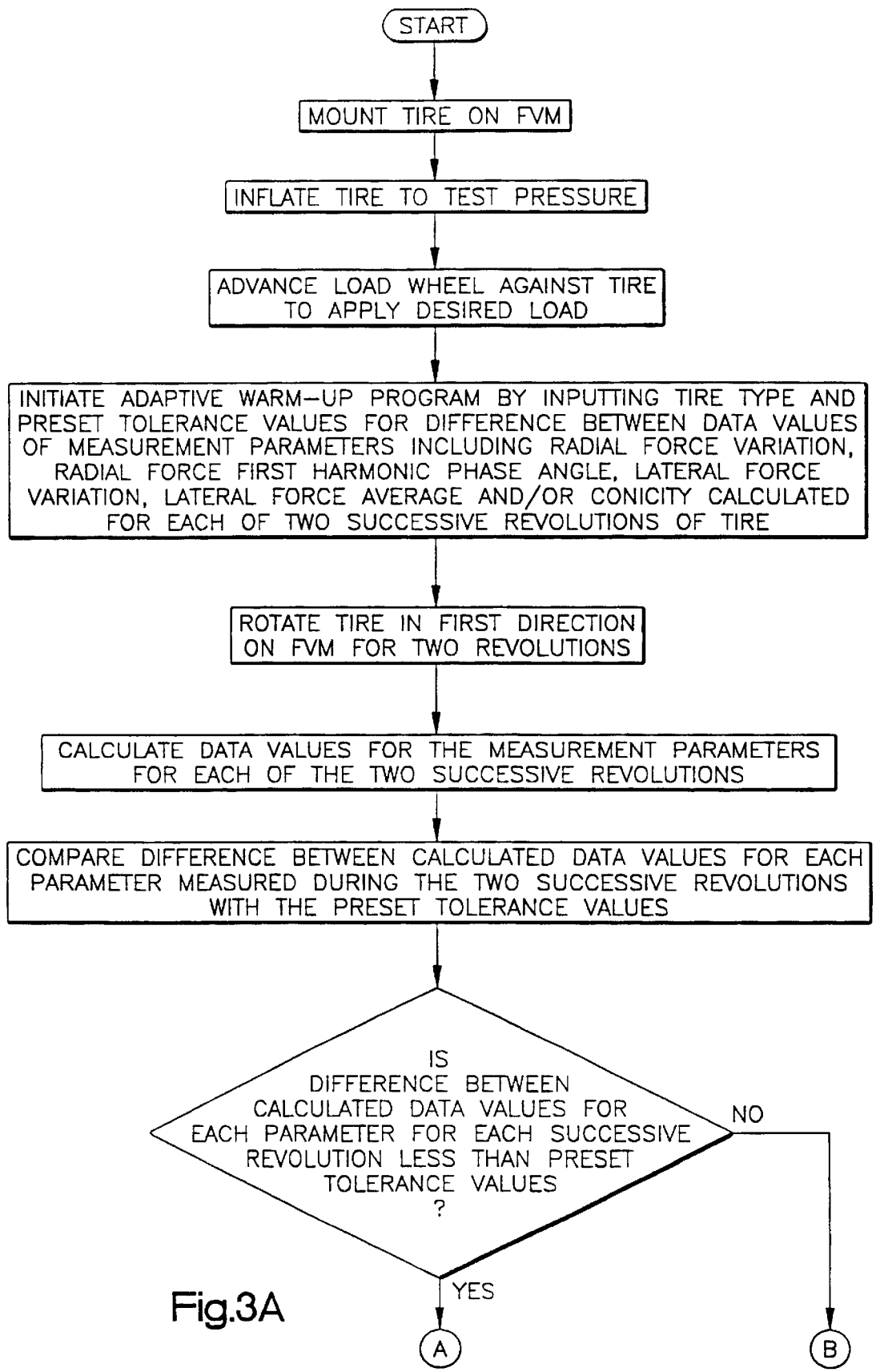
FIGS. 3A and 3B collectively compromise FIG. 3 which illustrates a flow diagram of the operation the first embodiment of the present invention.
Figure 3B:
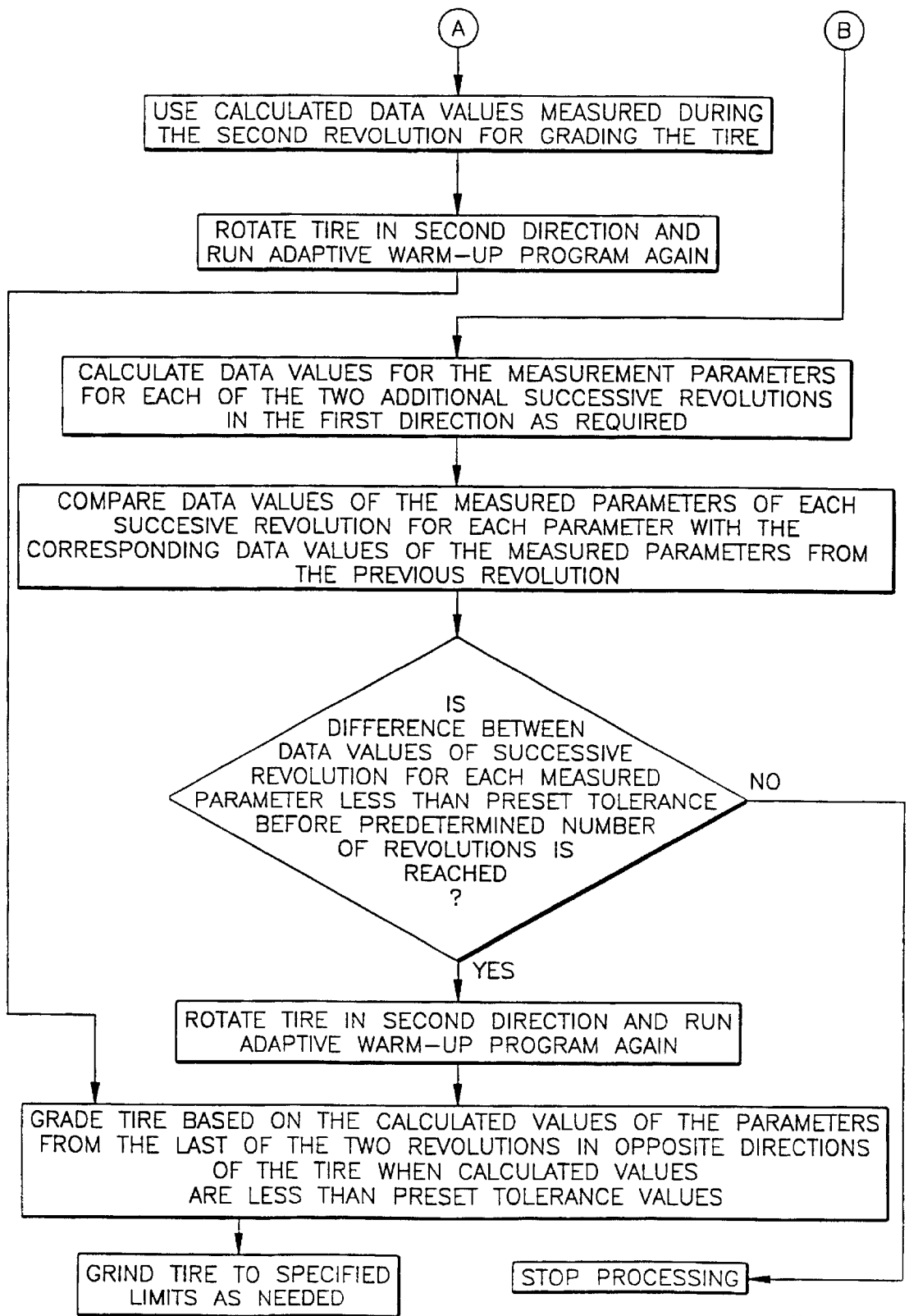

The present invention is directed to an adaptive warm-up cycle during which the computer determines when the tire is stabilized. An explanation of a first embodiment of an adaptive warm-up cycle follows. Referring to FIG. 3, there is illustrated a flow chart of the method steps for the first embodiment. After the tire is mounted to rim 14 and engaged by the load wheel 18 at a specified load, the tire is rotated in a first direction for two revolutions and the computer 32 calculates data values for selected parameters for each revolution. Typically, the data values for the following parameters, i.e., radial force variation (peak to peak), radial force first harmonic phase angle, lateral force variation (peak to peak), lateral force average, and/or conicity, are calculated for each revolution of the tire. A discussion of these measured parameters is disclosed in U.S. patent application Ser. No. 08/534,809, entitled METHOD OF CORRECTING CONICITY, RADIAL RUN OUT, AND FORCE VARIATIONS IN A PNEUMATIC TIRE, assigned to the Goodyear Tire & Rubber Company, the assignee of the present invention which is incorporated in its entirety herein. While the parameters for the measurements specified above are typically used in the calculations, it is within the scope of the invention to use any combination of the parameters or other tire measurement parameters as desired.

The data values for the parameters measured during the first revolution of the tire are compared with corresponding data values from the same parameters during the second revolution of the tire. If the difference between the corresponding data values is less than preset tolerance values for each parameter, the tire is considered to be warmed up and the machine cycle continues. However, if the difference between the corresponding data values for each parameter is more than the preset tolerance values, the tire is rotated for a third revolution and data measured by the load cells 28 for the selected parameters are inputted into computer 32 for the third revolution of the tire. The data values of the above parameters for the third revolution are again calculated and compared to the corresponding data values of the second revolution. This continues, i.e., for a third and fourth revolution and so on, until these comparisons show that the difference between the corresponding data values of the selected parameters are less than the preset tolerance values from one revolution to the next. The last revolution of data for the selected parameters that was collected is then used for grading the tire. Typically, there is a limit to the number of tire revolutions, as determined by the tire manufacturer, that the warm-up procedure can run.

Once the warm-up sequence, as described hereinbefore, is completed, the tire is rotated in the opposite direction from the first sequence, and again run through the adaptive warm-up procedure of the first embodiment. When the difference between the corresponding parameters of two successive revolutions of the tire is less than the preset tolerance values during the rotation in the second direction, the last revolution of data that was collected from the tire rotated in the second direction is then used for grading the tire. The force variation machine 10 continues its program, using the data of the parameters collected during the last revolution of the tire in the first and second directions to grind the tire as needed.

Using the adaptive warm-up procedure of the first embodiment, the following steps are followed:

1. The force variation machine is started.
2. A tire is mounted on the force variation machine.
3. The tire is inflated to a desired test pressure.
4. The load wheel is advanced against the tire to apply a desired load.
5. The tire type and preset tolerance values for each parameter being measured are inputted into the computer of the Force variation machine for calculating and comparing the difference between data values of the measured parameters including radial force variation, radial force first harmonic phase angle, lateral force variation, lateral force average, and/or conicity calculated for each of two successive revolutions of the tire.
6. The tire is rotated in a first direction on the force variation machine for two successive revolutions.
7. The data values for the measured parameters are calculated for each of the two successive revolutions.
8. The difference between the calculated data values for each corresponding measured parameter measured during the first two successive revolutions are compared with the preset tolerance values.
9. If the difference between the data values of each corresponding parameter measured during the first two successive revolutions is less than the preset tolerance values, the data values of each parameter measured during the second revolution are used for grading the tire being tested on the force variation machine.
10. If the difference between data values of each corresponding parameter measured during the first two successive revolutions is greater than the preset tolerance values, the tire is rotated for additional revolutions in the first direction, as required, and the data values for the measured parameters are calculated again.

11. The difference between the calculated data values for each corresponding parameter measured during the second and third revolutions, and then the third and fourth successive revolutions of the tire and so on with successive revolutions are compared with the preset tolerance values until the differences between the corresponding data values for the parameters measured during two successive revolutions are less than the preset tolerance values. The data values of the measured parameters from the last revolution when the differences between the calculated data values for each corresponding parameter measured during the last two successive revolutions of the tire are less than the preset tolerance values are used for grading the tire being tested on the force variation machine.

12. The tire is then rotated in the opposite direction on the force variation machine and the adaptive warm-up cycle is run again repeating steps 6 through 11.

13. If the tire is rotated in either direction more than a predetermined number of rotations, the adaptive warm-up cycle is aborted and the tire is typically graded and discarded if necessary.

14. The force variation machine is operated based on the calculated data values of the parameters from the last of the two opposite revolutions of the tire.

15. The tire is ground to specified limits as needed. The adaptive warm-up procedure has been tested to ensure that its use does not degrade the capability of a force variation machine to accurately grade a tire. There were two areas of focus for the testing: harmonic marking accuracy and the overall data accuracy.

The data accuracy was first tested using the following procedure. A tire was selected that had a known, relatively high radial force variation. The current warm-up procedure was followed with a warm-up time of six seconds for a first direction of rotation. The selected tire was run 20 times and a mark was made on the tire signifying the location of the high point of the radial force first harmonic. This resulted in a grouping of marks spanning an angle of 20 degrees. The standard deviation for the markings was calculated to be 6 degrees. The adaptive warm-up procedure for force variation machine 10, in accordance with the first embodiment of the invention, was then run in the computer 32. Then, the selected tire was turned over and again run 20 times. As with the first test, a mark was made on the selected tire signifying the location of the high point of the radial force first harmonic. With the latter test, the 20 data points resulted in a group that spanned 13 degrees. The standard deviation of this data was 5 degrees. The results of the two tests showed that the data acquired when using the adaptive warm-up procedure was better. That is, the data acquired from each rotation was closer to each other.

The overall data accuracy was further tested using two methods. The first test, in a laboratory, ran the same tire 24 times on a force variation machine 10 operating with the first embodiment of the warm-up procedure, i.e., using a fixed time period for warm-up of six seconds. The standard deviations for the forces being tested and the time required by the computer to conduct the tests are shown in Table I below. The average time for the computer control for each of the tests using a conventional warm-up cycle is 19.58 seconds (sec.).

TABLE I

| Radial Force Variation | Radial Force First Harmonic | Lateral Force Variation | Conicity | Computer Testing Time |
|---|---|---|---|---|
| 0.48 lb. | 0.45 lb. | 0.48 lb. | 0.60 lb. | 0.5 sec. 19.58 sec.avg. |

Standard Deviations for Tests with Conventional Warm-up Cycle

The same tire used for the test using the conventional warm-up cycle was then run 24 times but with a software program containing the adaptive warm-up feature of the present invention. The standard deviations for the forces being tested and the time required by the computer to conduct the second test of the same tire is shown in Table II below. The average time for the computer control for each of the second tests is 18.92 sec.

TABLE II

| Radial Force Variation | Radial Force First Harmonic | Lateral Force Variation | Conicity | Computer Testing Time |
|---|---|---|---|---|
| 0.78 lb. | 0.44 lb. | 0.24 lb. | 0.33 lb. | 1.22 sec. 18.92 sec.avg. |

Standard Deviations for Tests with Adaptive Warm-up Cycle

The results of the two tests shown in Tables I and II indicate that except for the Radial Force Variation, the deviations for the other parameters decreased and the average time that the computer used in testing also decreased. Assuming that the increase in the standard deviation of the Radial Force variation is acceptable, the new adaptive warm-up cycle is advantageous as it decreases the time need to conduct the tests. That is, there is a savings of 0.66 sec. per tire. This savings in time in a factory setting where tires are being manufactured and tested is quite significant and represents a savings in equipment needs and manufacturing time.

The second method used to test the data accuracy was a 5×5 test in a production environment. A 5×5 test means that five tires of known values are each tested five times. The first test was with a force variation machine in a production environment being programed with a current warm-up cycle set to warm-up each tire for a time of 6 seconds. The standard deviations from the first tests are shown in Table III below. The average computer time to run each of these first tests was 21 seconds.

TABLE III

| Tire # | Radial Force Variation | Radial Force First Harmonic | Lateral Force Variation | Conicity |
|---|---|---|---|---|
| 1 | 0.41 lb. | 0.31 lb. | 0.14 lb. | 0.11 lb. |
| 2 | 0.22 lb. | 0.18 lb. | 0.21 lb. | 0.18 lb. |
| 3 | 0.21 lb. | 0.11 lb. | 0.21 lb. | 0.11 lb. |
| 4 | 0.18 lb. | 0.25 lb. | 0.14 lb. | 0.11 lb. |
| 5 | 0.22 lb. | 0.21 lb. | 0.11 lb. | 0.14 lb. |

Standard Deviations for 5×5 Tests Using Current Warm-up Cycle

The second test was with the same force variation machine in a production environment being programed with an adaptive warm-up cycle as set forth in present invention. The standard deviations from the second tests are shown in Table IV below. The average computer time to run each of these second tests dropped to 17 seconds.

TABLE IV

| Tire # | Radial Force Variation | Radial Force First Harmonic | Lateral Force Variation | Conicity |
|---|---|---|---|---|
| 1 | 0.54 lb. | 0.48 lb. | 0.18 lb. | 0.37 lb. |
| 2 | 0.76 lb. | 0.80 lb. | 0.18 lb. | 0.21 lb. |
| 3 | 0.48 lb. | 0.69 lb. | 0.21 lb. | 0.22 lb. |
| 4 | 0.37 lb. | 0.52 lb. | 0.14 lb. | 0.27 lb. |
| 5 | 0.50 lb. | 0.18 lb. | 0.33 lb. | 0.11 lb. |

Standard Deviations for 5×5 Tests Using Adaptive Warm-up Cycle

The results of the two tests in a production environment, as shown in Tables III and IV indicate that while many of the standard deviations for the parameters increased with the use of the adaptive warm-up cycle instead of the current warm-up procedure, the average time that the computer used in testing decreased by four seconds. Since the increases in the standard deviations of some of the parameters is acceptable in a production environment, the decrease in computer time with the use of the adaptive warm-up cycle is extremely important since it reduces the warm-up cycle and provides adequately accurate data, which in turn, maximizes the utilization of the force variation machine during tire production. A second embodiment of the invention incorporates an adaptive warm-up cycle which follows the general principles of the first embodiment and includes another data collection step to further optimize the time required to calculate the data by the computer and determine when the tire has stabilized. An explanation of the adaptive warm-up cycle for the second embodiment follows.

After the tire is mounted to rim 14 of the force variation machine 10 and is engaged by the load wheel 18 to a specified load, the tire is rotated in a first direction and the computer 32 calculates data values for selected parameters for the first three revolutions. Typically, the data values for the following parameters, i.e., radial force variation (peak to peak), radial force first harmonic phase angle, lateral force variation (peak to peak), lateral force average, and/or conicity are calculated for each revolution of tire. While the parameters for the measurements specified above are typically used in the calculations, it is within the scope of the invention to use any combination of the parameters or even other parameters as desired.

The data values for the selected parameters for the first revolution of the tire are compared with the date values of the corresponding parameters during the second revolution of the tire. If the difference between the data values of the corresponding parameters is less than preset tolerance values for each parameter, the tire is considered to be warmed up and the machine cycle continues. However, if the difference between the data values for each corresponding parameter is more than the preset tolerance values, the data values of the parameters from the second revolution are compared with the data values of the corresponding parameters from the third revolution while the data values for the selected parameters of the fourth revolution are being simultaneously computed by the computer. This process continues until these comparisons show that the difference between the corresponding data values of the selected parameters are less than the preset tolerance values from one revolution to the next. The last revolution of collected data, where the difference between the data values for each parameter is less than the preset tolerance values, is then used for grading the tire. Typically, there is a limit to the number of tire revolutions, as determined by the tire manufacturer, that the vim adaptive warm-up procedure can run.

Once the adaptive warm-up cycle, as described hereinbefore, is completed, the tire is rotated in the opposite direction from the first sequence, and again run through the adaptive warm-up procedure. When the difference between the corresponding data values of the selected parameters are less than the preset tolerance values from one revolution to the next, the last revolution of data for the selected parameters that was collected is then used for grading the tire. Typically, there is a limit to the number of tire revolutions, as determined by the tire manufacturer, that the warm-up procedure can run. The force variation machine continues its program using the data from the selected parameters from the last revolution in each of the opposite directions of rotation to grind the tire as needed.

Figure 4A:
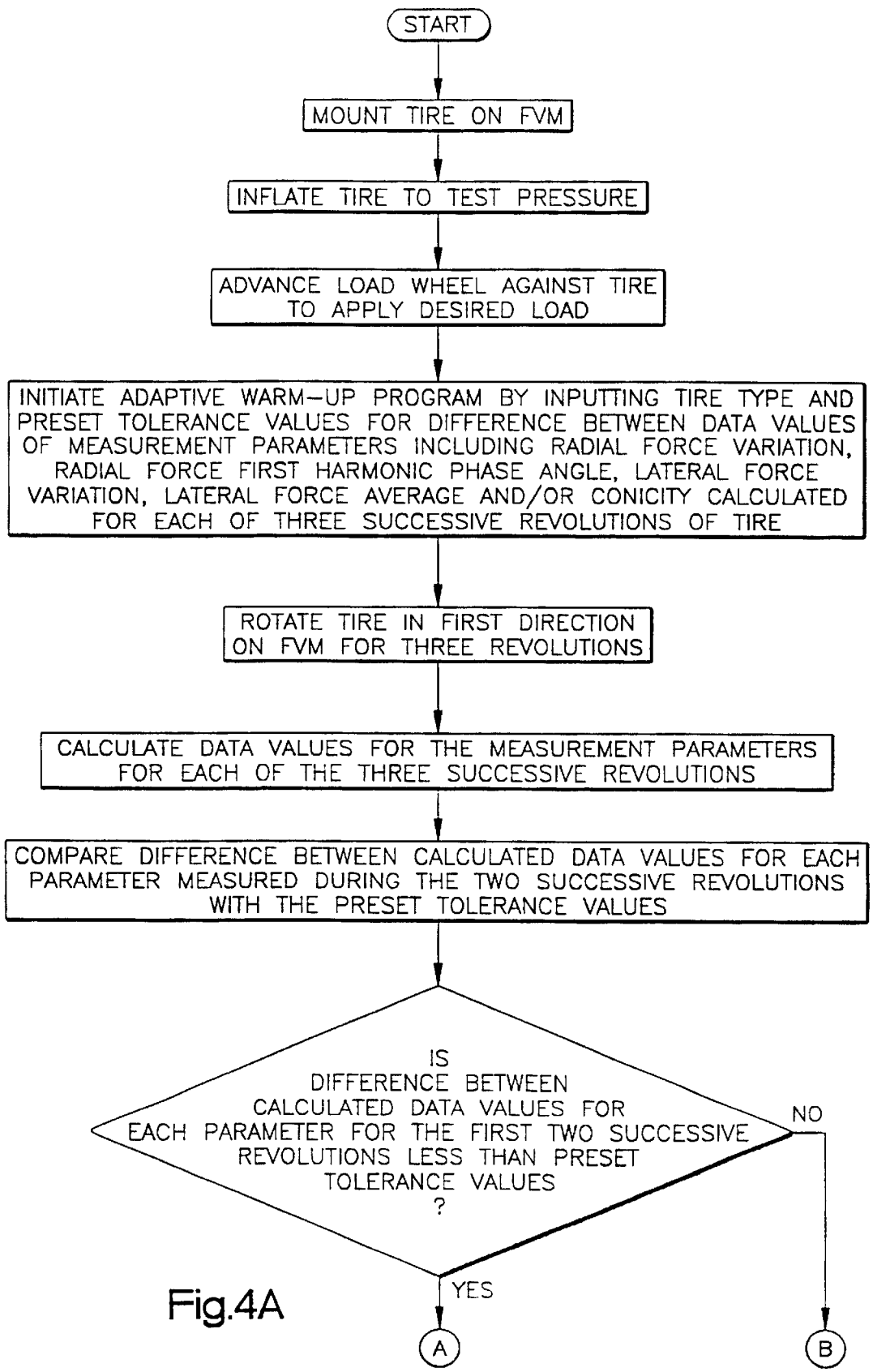
FIGS. 4A and 4B collectively compromise FIG. 4 which illustrates a flow diagram of the operation the second embodiment of the present invention.
Figure 4B:
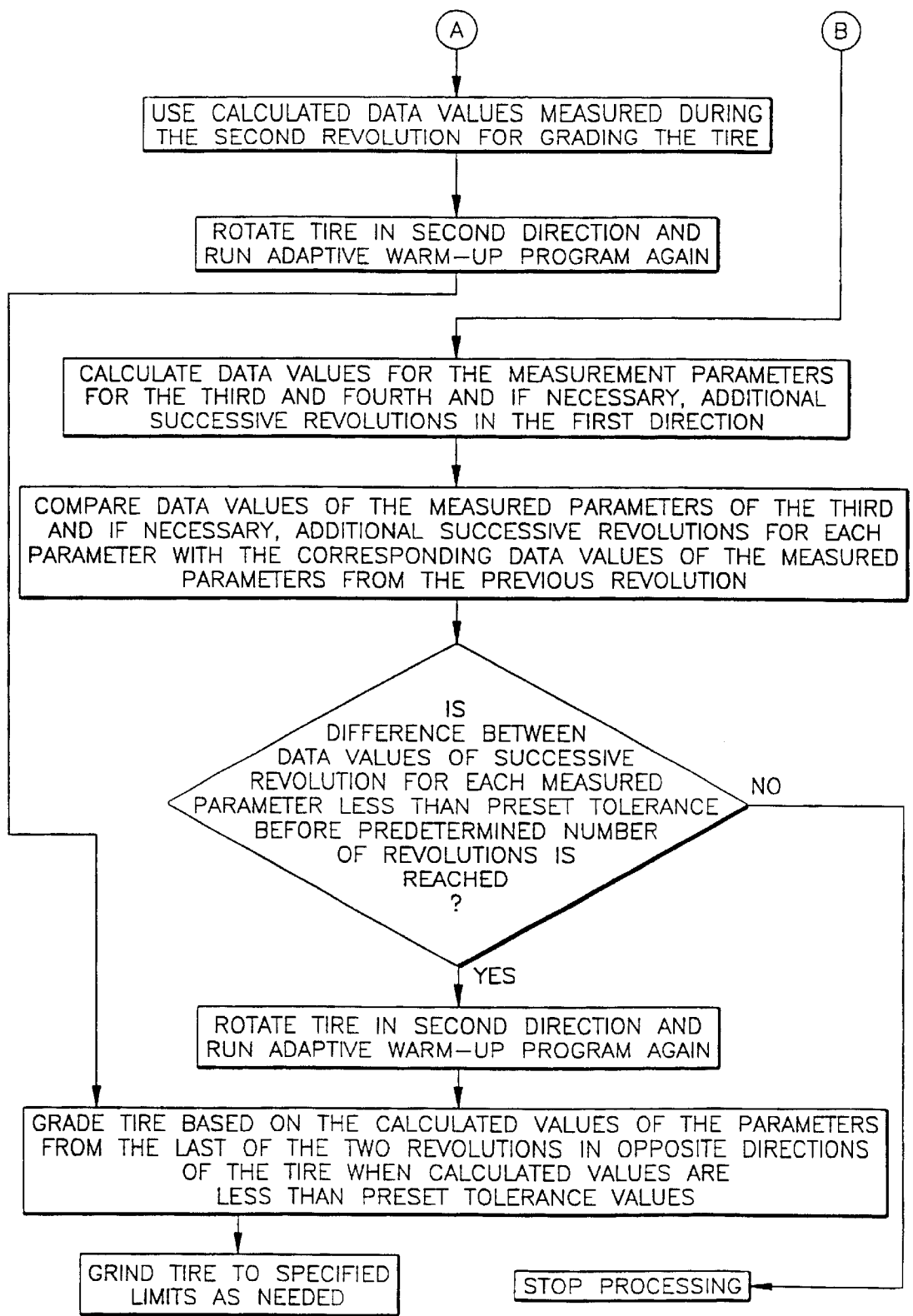

Using the adaptive warm-up procedure of the second embodiment, as generally shown in FIG. 4, the following steps are followed:

1. The force variation machine is started.
2. A tire is mounted on the force variation machine.
3. The tire is inflated to a desired test pressure.
4. The load wheel is advanced against the tire to apply a desired load.
5. The tire type and preset tolerance values for each parameter being measured are inputted into the computer of the force variation machine for calculating and comparing the difference between data values of the measured parameters including radial force variation, radial force first harmonic phase angle, lateral force variation, lateral force average, and/or conicity calculated for each of two successive revolutions of the tire.
6. The tire is rotated in a first direction on the force variation machine for three successive revolutions.
7. The data values for the measured parameters are calculated for each of the three successive revolutions.
8. The difference between the calculated data values for each corresponding parameter measured during the first two successive revolutions are compared with the preset tolerance values.
9. If the difference between the data values of each corresponding parameter measured during the first two successive revolutions are less than the preset tolerance values, the data values of each parameter measured during the second revolution are used for grading the tire by the force variation machine.
10. If the difference between the data values of each corresponding parameter measured during the first two successive revolutions are greater than the preset tolerance values, the difference between data values of each corresponding parameter measured during the second and third revolutions are compared with the preset tolerance values while the computer is calculating the data values for the measured parameters from the fourth revolution.
11. This process continues until the differences in the data values for the corresponding parameters measured during two successive revolutions of the tire are less than the preset tolerance values. The data values of the measured parameters from the last revolution of when two successive revolutions of the tire is less than the preset tolerance values is used for grading the tire being tested on the force variation machine.

12. The tire is then rotated in the opposite direction from the first test on the force variation machine and the adaptive warm-up cycle is run again repeating steps 6 through 11.
13. If the tire is rotated in either direction more than a predetermined number of rotations, the adaptive arm-up program is aborted and the tire is typically discarded.
14. The force variation machine is operated based on the calculated data values of the parameters from the last of the two opposite revolutions of the tire.
15. The tire is then ground to specified limits as needed.

A third embodiment of the invention incorporates an adaptive warm-up cycle which follows the general principles of the first and second embodiments and includes another data collection step to further optimize the time required to calculate the data by the computer and determine when the tire has stabilized. An explanation of the adaptive warm-up cycle for the third embodiment follows.

After the tire is mounted to rim 14 of the force variation machine 10 and is engaged by the load wheel 18 to a specified load, the tire is rotated in a first direction and the computer 32 calculates data values for four revolutions in a first direction. Typically, the values for the following parameters, i.e., radial force variation (peak to peak), radial force first harmonic phase angle, lateral force variation (peak to peak), lateral force average, and/or conicity are calculated for each revolution of tire. While the parameters for the measurements specified above are typically used in the calculations, it is within the scope of the invention to use any combination of the parameters as desired.

The average of the data values for each parameter for the four revolutions of the tire are compared with the date values of the corresponding parameters during the fourth revolution of the tire. If the difference between the average data values and the data values of the fourth revolution are less than the preset tolerance values for each parameter, the tire is considered to be warmed up and the machine cycle continues. However, if the difference between the average data values for each parameter and the data values for the corresponding parameters calculated from the data generated during the fourth revolution is more than the preset tolerance values, the computer 32 calculates data values for each parameter for the next four revolutions in a first direction. Then the data values from the eighth revolution are compared with the data values from the average of the data values for each parameter from the fourth to eight revolution. This process continues until these comparisons show that the parameters are not changing significantly, i.e., are less than the preset tolerance values. The last revolution of collected data where the difference between the data values for each parameter is less than the preset tolerance values is then used for grading the tire. Typically, there is a limit to the number of tire revolutions, as determined by the tire manufacturer, that the adaptive warm-up procedure can run.

Once the adaptive warm-up sequence of the third embodiment, as described hereinbefore, is completed, the tire is rotated in the opposite direction from the first sequence, and again run through the adaptive warm-up procedure. When the parameters being tested during the rotation in the second direction do not change significantly from one revolution to the next, the force variation machine continues its program to grind the tire as needed.

Figure 5A:
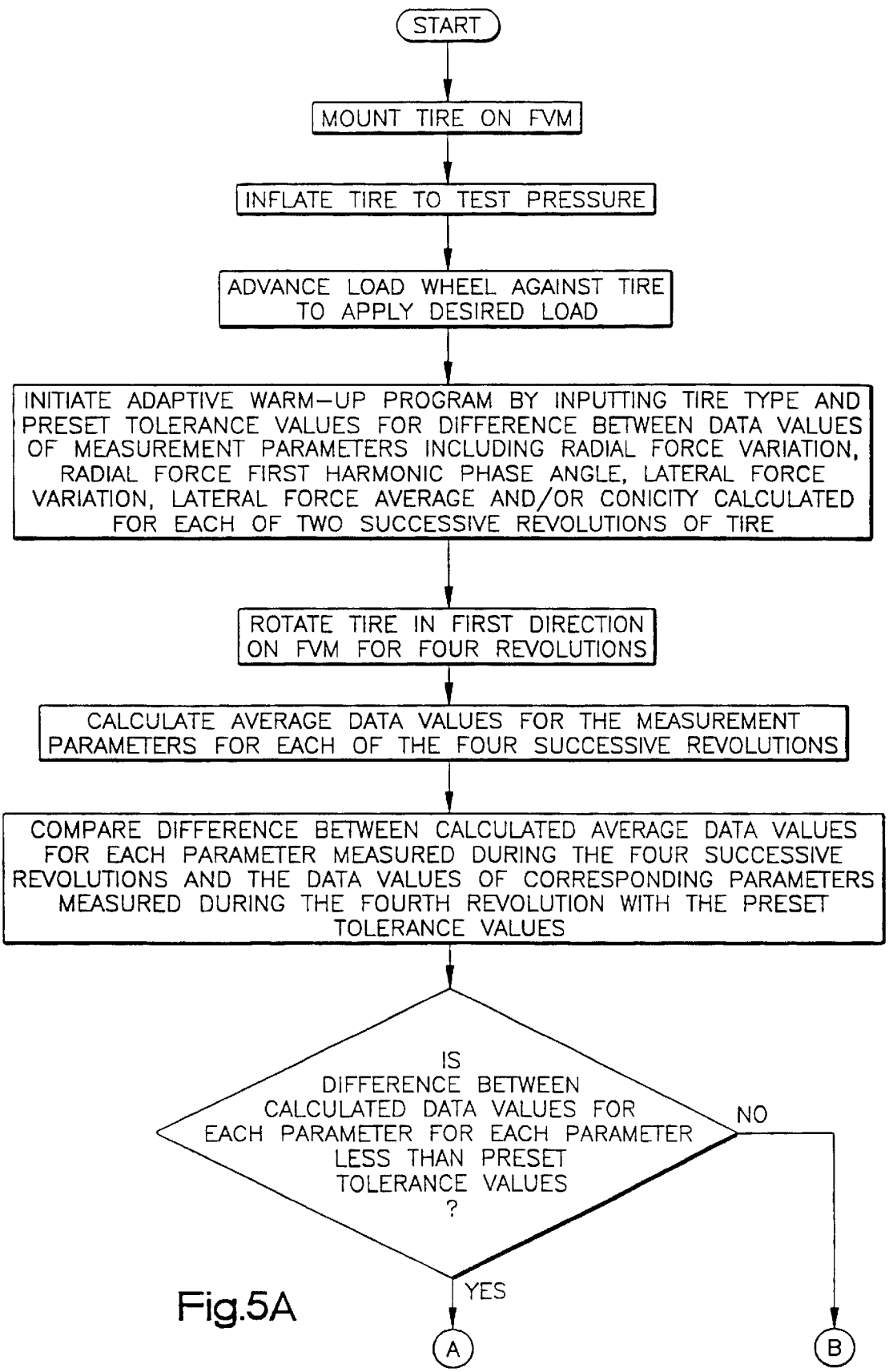
FIGS. 5A and 5B collectively compromise FIG. 5 which illustrates a flow diagram of the operation the third embodiment of the present invention.
Figure 5B:
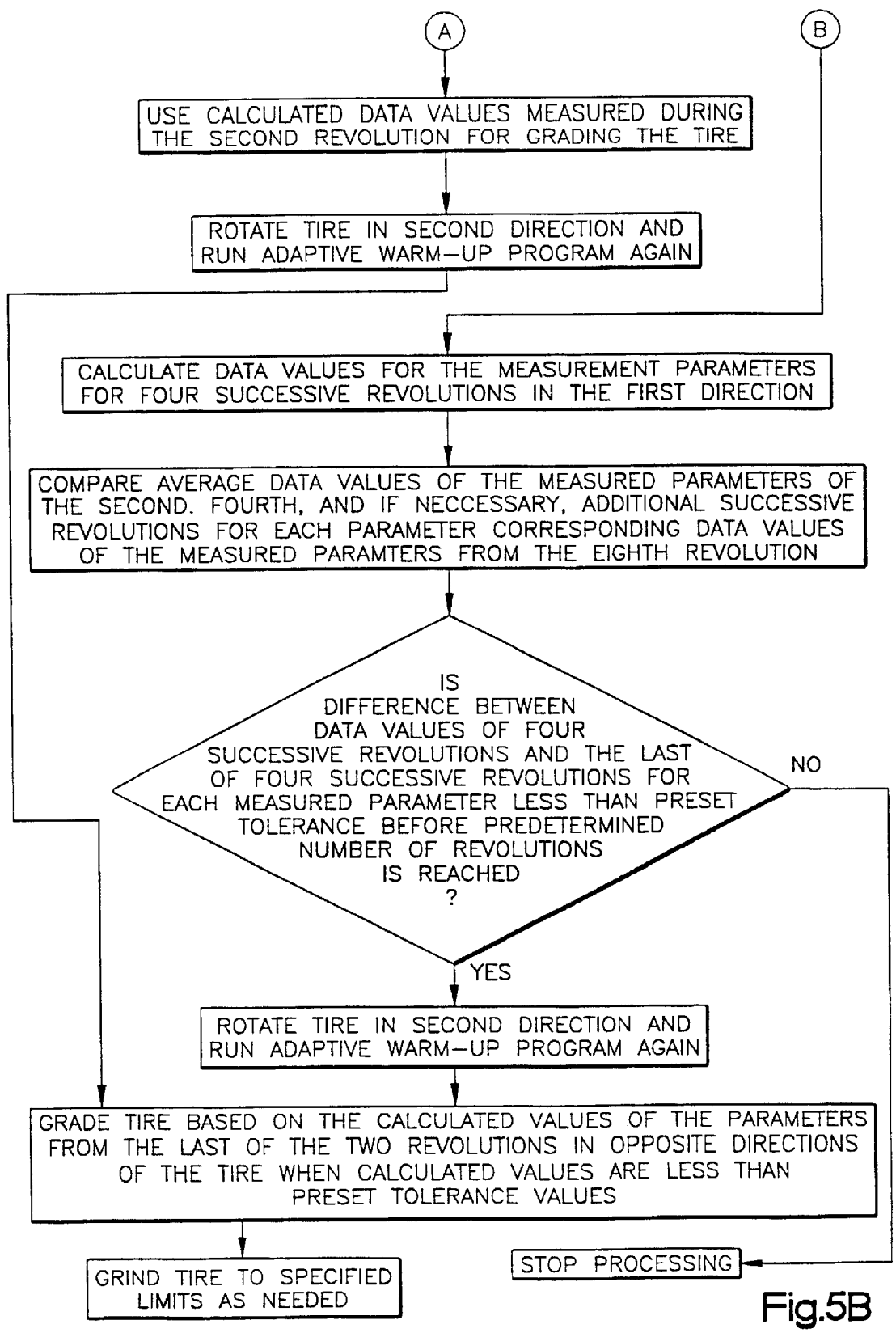

Using the adaptive warm-up procedure of the third embodiment, as generally shown in FIG. 5, the following steps are followed:

1. The force variation machine is started.
2. A tire is mounted on the force variation machine.
3. The tire is inflated to a desired test pressure.
4. The load wheel is advanced against the tire to apply a desired load.
5. The tire type and preset tolerance values for each Gregg parameter being measured are inputted into the computer of the force variation machine for calculating and comparing with the difference between data values of the measured parameters including radial force variation, radial force first harmonic phase angle, lateral force variation, lateral force average, and/or conicity calculated for each of two successive revolutions of tire.
6. The tire is rotated in a first direction on the force variation machine for four successive revolutions.
7. The average data values for the measured parameters are calculated for the four successive revolutions.
8. The difference between the average of the data values for each parameter measured during the first four successive revolutions and the data values for each parameter measured during the fourth successive revolution are compared with the preset tolerance values.
9. If the differences between the average data values of each parameter measured during the first four successive revolutions and the data values of each parameter measured during the fourth revolution are less than the preset tolerance values, the data values of each parameter measured during the fourth revolution are used for grading the tire by the force variation machine.
10. If the differences between the average data values of each parameter measured during the first four successive revolutions and the data values of each corresponding parameter measured during the fourth revolution are greater than the preset tolerance values, the tire is rotated for an additional four revolutions.
11. The differences between the average data values for each corresponding parameter for the next four revolutions in the first direction and the data values for the corresponding parameters of the eighth revolution are compared with the preset tolerance values.
12. This process continues until the differences between the the average data values for the corresponding parameters measured during the four successive revolutions and the last of the four successive revolutions of the tire is less than the preset tolerance values. The data values of the measured parameters from the last revolution of when the difference between the calculated data values for each corresponding parameter measured during the last two successive revolutions of the tire is less than-the preset tolerance values is used for grading the tire being tested on the force variation machine.
13. The tire is then rotated in the opposite direction on the force variation machine and the adaptive warm-up cycle is run again repeating steps 6 through 12.
14. If the tire is rotated in either direction more than a predetermined number of rotations, the adaptive warm-up cycle is aborted and the tire is typically graded and/or discarded.
15. The force variation machine is operated based on the calculated data values of the parameters from the last of the two opposite revolutions of the tire.
16. The tire is ground to specified limits as needed. The data values from the last of these revolutions is used to operate the force variation machine.

There are a number of benefits to the use of the adaptive warm-up procedures of the embodiments described above. These include the use of the measurements of the adaptive warm-up to remove occasional random disturbances which might be caused by machines that are not working in accordance with their original manufacturing specifications. Also, the process could be used as a diagnostic tool for detecting variations in the machine or the process of manufacturing the tires. That is under normal conditions, the manufacturing process varies within certain limits, therefore; if abnormal readings are detected, problems in the machine or the manufacturing process can be recognized. Also, by using the same types of tires on different machines, machines can be compared with each other. Further, random disturbances in the machines can be also be detected.

It is apparent that there has been provided in accordance with this invention several embodiments of an adaptive warm-up cycle for a force variation machine.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

I claim:

1. A method for cycling each tire being tested on a force variation machine through an adaptive warm-up cycle, comprising the steps of:
    a) inputting a tire type and preset tolerance values for each parameter of a tire being measured into said force variation machine on which said tire being tested is mounted;
    b) rotating said tire in a first direction for two successive revolutions;
    c) calculating data values for each of said parameters being measured during each of said two successive revolutions;
    d) determining the differences between the calculated data values for each of said parameters being measured during said first two successive revolutions and said preset tolerance values for each of said parameters being measured;
    e) selecting said data values of each of said parameters being measured during said second revolution for grading said tire, if the difference between data values of each of said corresponding parameters measured during said first two successive revolutions is less than a corresponding one of said preset tolerance values;
    f) rotating said tire in a second opposite direction on said force variation machine and running said adaptive warm-up cycle again repeating steps c) through e);
    g) rotating said tire for one or more additional revolutions and again calculating the data values for the measured parameters, if the difference between data values of each corresponding parameter measured during the said first two successive revolutions is greater than said preset tolerance values;
    h) determining the differences between said calculated data values for each corresponding parameter measured during successive revolutions after said second revolution and said preset tolerance values until the difference between the corresponding data values for the parameters measured during any two successive revolutions is less than said preset tolerance values; and
    i) repeating steps f)–h).

2. The method of claim 1 including the steps of:
    j) grading said tire being tested on said force variation machine with said data values of the measured parameters from the last revolution when the difference between the calculated data values for each corresponding parameter measured during the last two successive revolutions of the tire are less than said preset tolerance values; and
    k) operating said force variation machine using said calculated data values of the parameters from the last of said first and second opposite revolutions of said tire.

3. The method of claim 1 including the step of inflating said tire to a desired test pressure.

4. The method of claim 1 including the step of selecting said parameters from the group including radial force variation, radial force first harmonic phase angle, lateral force variation, lateral force average, and/or conicity.

5. The method of claim 1 including the step of aborting said adaptive warm-up cycle if said tire is rotated in either said first or second directions more than a predetermined number of rotations.

6. A method for cycling each tire being tested on a force variation machine through an adaptive warm-up cycle comprising the steps of:
    a) inputting a tire type and preset tolerance values for each parameter of a tire being measured into said force variation machine on which said tire being tested is mounted;
    b) rotating said tire in a first direction for three successive revolutions;
    c) calculating data values for each of said measured parameters being measured during each of said three successive revolutions;
    d) determining the differences between the calculated data values for each of said parameters being measured during the first two successive revolutions and said preset tolerance values for each of said parameters being measured;
    e) selecting said data values of each of said parameters being measured during said second revolution for grading said tire, if the differences between data values of each of said corresponding parameters measured during said first two successive revolutions is less than a corresponding one of said preset tolerance values;
    f) rotating said tire in a second opposite direction on said force variation machine and running said adaptive warm-up cycle again repeating steps c) through e);
    g) rotating said tire for a fourth revolution and determining the differences between data values of each corresponding parameter measured during the second and third revolutions and said preset tolerance values while simultaneously calculating the data values for the parameters measured during said fourth revolution if the differences between data values of each of said parameters measured during the first two successive revolutions are greater than said preset tolerance values;
    h) determining the differences between the calculated data values for each of said parameters being measured during successive revolutions after said third and fourth revolutions and said preset tolerance values until the differences between the corresponding data values for the parameters measured during any two successive revolutions is less than said preset tolerance values; and
    i) repeating steps f)–h).

7. The method of claim 6 including the steps of:

j) grading said tire being tested on said force variation machine with said data values of the measured parameters from the last revolution when the difference between the calculated data values for each corresponding parameter measured during the last two successive revolutions of the tire are less than said preset tolerance values; and k) operating said force variation machine using said calculated data values of the parameters from the last of said first and second opposite revolutions of said tire.

8. The method of claim 6 including the step of inflating said tire to a desired test pressure.

9. The method of claim 6 including the step of selecting said parameters from the group including radial force variation, radial force first harmonic phase angle, lateral force variation, lateral force average, and/or conicity.

10. The method of claim 6 including the step of aborting said adaptive warm-up cycle if said tire is rotated in either direction more than a predetermined number of rotations.

11. A method for cycling each tire being tested through an adaptive warm-up cycle on a force variation machine, comprising the steps of:

a) inputting a tire type and preset tolerance values for each parameter of a tire being measured into said force variation machine on which said tire is being tested;

b) rotating said tire in a first direction for four successive revolutions;

c) calculating the average data values for each measured parameter for each of said four successive revolutions;

d) calculating the differences between the average of the calculated data values for each corresponding measured parameter measured during the first four successive revolutions with said preset tolerance values;

e) selecting said data values of each parameter measured during said fourth revolution for grading said tire if the difference between each of said average data values of each of said corresponding parameters measured during said first four successive revolutions is less than said corresponding preset tolerance values;

f) rotating said tire in a second opposite direction on said force variation machine and running said adaptive warm-up cycle again repeating steps c) through e);

g) rotating said tire for an additional one or more sets of four successive revolutions and again calculating the average data values for the measured parameters if the difference between said average data values of each corresponding parameter measured during said additional one or more sets of four successive revolutions are greater than said preset tolerance values;

h) determining the difference between the average data values of each corresponding parameter measured during the last set of four successive revolutions and the data values of each corresponding parameter measured during the last revolution of the last set of four successive revolutions until the differences between the average corresponding data values and the data values for the last revolution of the parameters measured are less than said preset tolerance values; and i) repeating steps f)–h).

12. The method of claim 11 including the steps of:

j) grading said tire being tested on said force variation machine with said data values of the measured parameters from the last revolution of when the difference between the calculated average data values for each corresponding parameter measured during the four successive revolutions of said tire and the last revolution of said four successive revolutions are less than said preset tolerance values; and k) operating said force variation machine using said calculated data values of the parameters from the last of said first and second four successive opposite revolutions of said tire.

13. The method of claim 11 including the step of inflating said tire to a desired test pressure.

14. The method of claim 11 including the step of selecting said parameters from the group including radial force variation, radial force first harmonic phase angle, lateral force variation, lateral force average, and/or conicity.

15. The method of claim 11 including the step of aborting said adaptive warm-up cycle if said tire is rotated in either direction more than a predetermined number of rotations.

\* \* \* \* \*